United States Patent [19]

Kawaguchi et al.

[11] Patent Number: 4,742,881
[45] Date of Patent: May 10, 1988

[54] RADIATOR ATTACHING APPARATUS

[75] Inventors: Yuji Kawaguchi, Tokyo; Shinji Chizaki, Wako; Yoshimasa Misonow, Higashikurume, all of Japan

[73] Assignee: Honda Giken Kogyo Kabushiki Kaisha, Tokyo, Japan

[21] Appl. No.: 857,284

[22] Filed: Apr. 30, 1986

[30] Foreign Application Priority Data

Apr. 30, 1985 [JP] Japan .............. 60-63162[U]
Nov. 5, 1985 [JP] Japan .............. 60-169154[U]

[51] Int. Cl.$^4$ .............................................. B60K 5/12
[52] U.S. Cl. .................................. 180/68.4; 248/634
[58] Field of Search ............... 180/68.4, 300, 312; 248/634; 165/67

[56] References Cited

U.S. PATENT DOCUMENTS

| 3,128,978 | 4/1964 | Sykes ........................... 248/22 |
| 3,663,002 | 5/1972 | Gergle et al. ................. 267/136 |
| 4,564,168 | 1/1986 | Ikuta et al. .................. 180/68.4 |
| 4,579,184 | 4/1986 | Hiramoto ..................... 180/68.4 |
| 4,610,420 | 9/1986 | Fukushima et al. ............. 180/300 |

FOREIGN PATENT DOCUMENTS

| 2137121 | 2/1973 | Fed. Rep. of Germany ..... 180/68.4 |
| 2634990 | 2/1978 | Fed. Rep. of Germany . |
| 2648407 | 4/1978 | Fed. Rep. of Germany . |
| 1545095 | 5/1979 | Fed. Rep. of Germany . |
| 1564284 | 4/1980 | Fed. Rep. of Germany . |
| 1571098 | 7/1980 | Fed. Rep. of Germany . |
| 0046566 | 8/1981 | Fed. Rep. of Germany . |
| 0126855 | 2/1984 | Fed. Rep. of Germany . |
| 1456558 | 11/1976 | France . |
| 0161616 | 9/1983 | Japan ........................... 180/68.4 |
| 0092218 | 5/1984 | Japan ........................... 180/68.4 |
| 923703 | 4/1963 | United Kingdom . |
| 2132951 | 7/1984 | United Kingdom . |

Primary Examiner—David M. Mitchell
Attorney, Agent, or Firm—Armstrong, Nikaido, Marmelstein & Kubovcik

[57] ABSTRACT

The present invention is directed to an apparatus for attaching a radiator to a vehicle body, the body having a bulkhead frame for interconnecting front end parts of a pair of right and left side frames wherein the radiator is located in a space defined by the upper frame member of the bulkhead and the front end parts of the two front side frames. The apparatus comprises projections extending upwards from the radiator; openings in the upper frame member corresponding to projections; and a resilient supporting member in the openings wherein the projection is retained in the opening by the resilient supporting member.

7 Claims, 3 Drawing Sheets

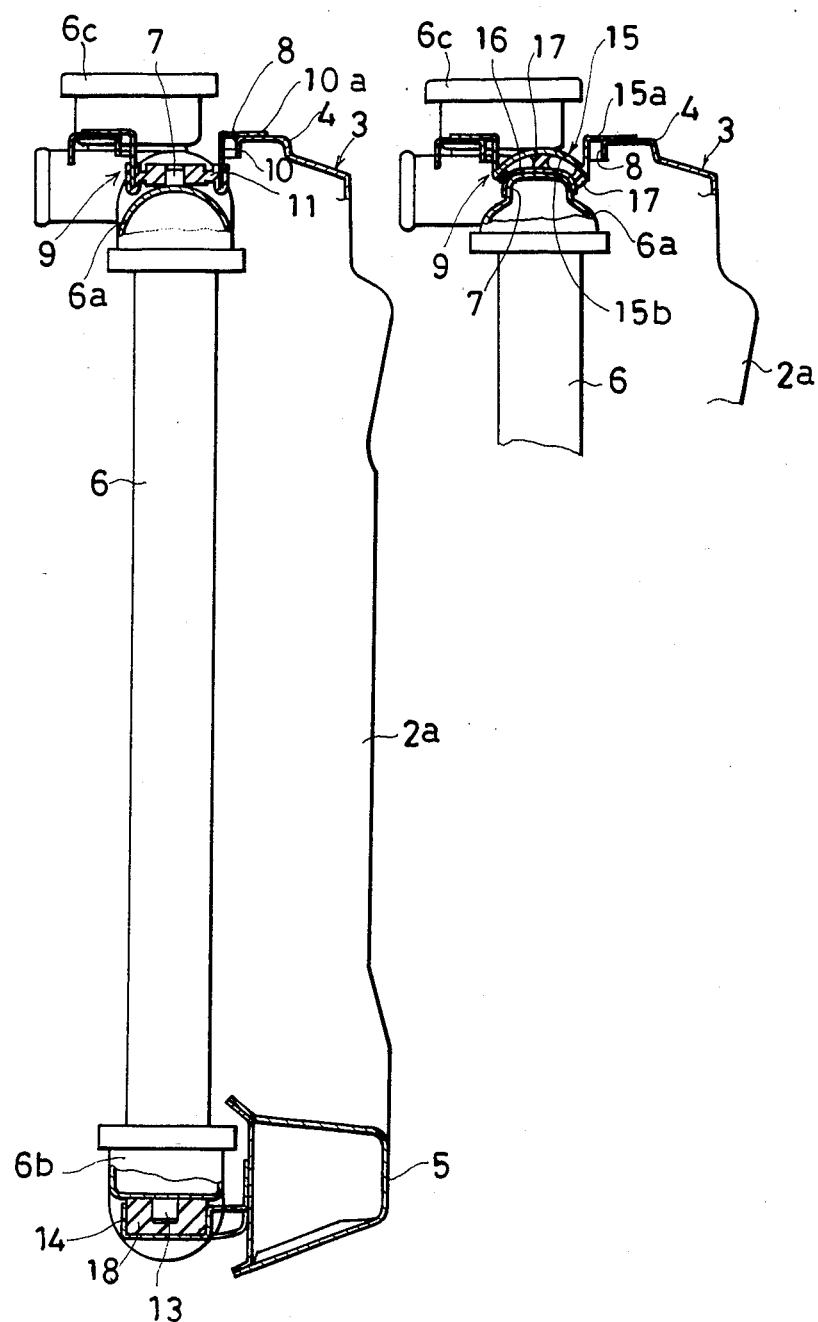

RADIATOR ATTACHING APPARATUS

BACKGROUND OF THE INVENTION

1. Field of the Invention

The present invention is directed to an apparatus for attaching a radiator to a vehicle and more particularly, to an apparatus for attaching a radiator to a vehicle in which the radiator includes projections which extend into corresponding openings in the vehicle frame.

2. Description of the Prior Art

In prior art devices for attaching a radiator to a vehicle, the vehicle body has a bulkhead frame for interconnecting the front end parts of a pair of left and right front side frames. The radiator is located in a space defined by an upper frame member of the bulkhead frame and the front end parts of the two front side frames. It has been usual with this type of attaching apparatus to bolt or screw the radiator to the front side frame on each side through a stay projecting laterally from each side surface thereof.

In the foregoing prior art apparatus, since the respective stays are on both side surfaces of the radiator and project outwards in the lateral direction, there is a problem in that the main body of the radiator cannot be made large in the width thereof, and in addition, since the stay on each side serves as a cantilever type support, there is a problem of ensuring the strength thereof without increasing the weight of the stay. Additionally, since it is necessary to fasten the stays to the vehicle frame with bolts or screws, the fastening of the radiator is carried out from the inside of the rear of the bulkhead frame, and thus the working efficiency is poor.

SUMMARY OF THE INVENTION

It is an object of the present invention to provide an apparatus for attaching a radiator to a vehicle in which side stays on the radiator are eliminated.

It is another object of the present invention to provide an apparatus for attaching a radiator to a vehicle wherein the elimination of stays enables the radiator to be made larger.

It is still another object of the present invention to provide an apparatus for attaching a radiator to a vehicle wherein the radiator can be attached from the top of the frame and thus, above the vehicle.

The present invention is directed to an apparatus for attaching a radiator to a vehicle body, the body having a bulkhead frame for interconnecting front end parts of a pair of right and left side frames wherein the radiator is located in a space defined by an upper frame member of the bulkhead and the front end parts of the two front side frames. The apparatus comprises projections extending upwards from the radiator; openings in the upper frame member corresponding to projections; and a resilient supporting member in the openings wherein the projection is retained in the opening by the resilient supporting member.

BRIEF DESCRIPTION OF THE DRAWINGS

FIG. 4 is an enlarged sectional view taken along the line IV—IV in FIG. 2.

FIG. 7 is a sectional side view of a portion of an alternative embodiment of the present invention.

DETAILED DESCRIPTION OF THE PREFERRED EMBODIMENT

Figure 1:
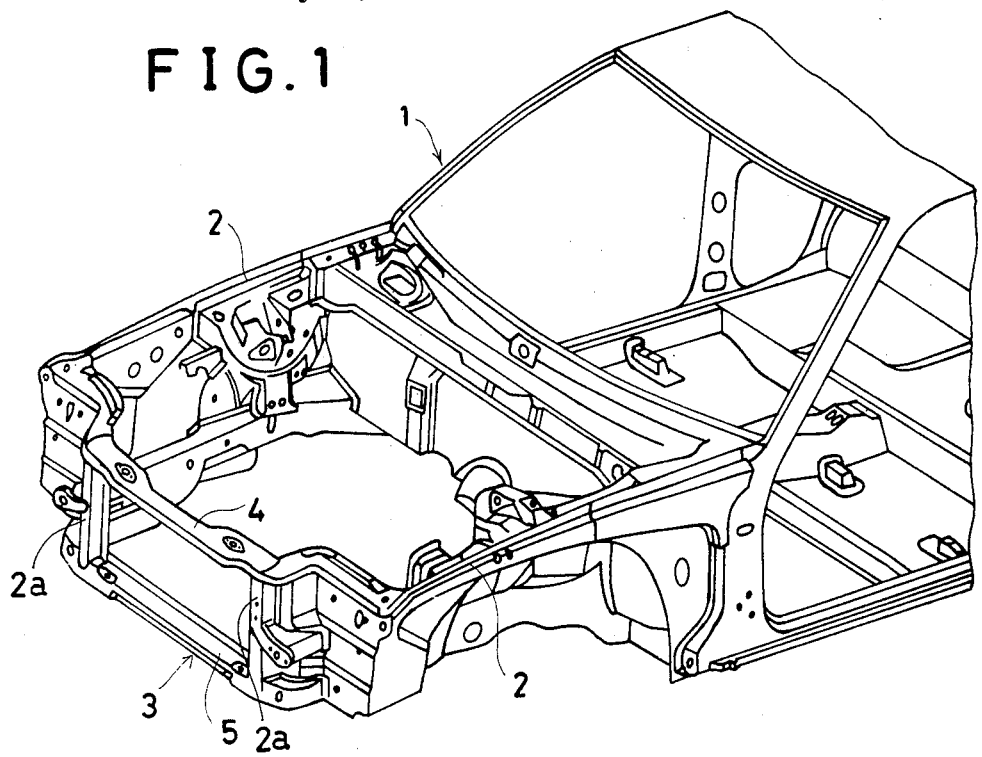
FIG. 1 is a perspective view of a car body having an attaching apparatus of the present invention.

Referring to the drawings, a vehicle body 1 has on the front portion thereof a pair of right and left front side frames 2, 2 and a bulkhead frame 3 for interconnecting between front end parts 2a, 2a of the two front side frames 2, 2. The bulkhead frame 3 comprises an upper frame member 4 positioned at the upper ends of the inside regions of the front end parts 2a, 2a of the right and left front side frames 2, 2 and a lower frame member 5 positioned at the lower ends thereof. In addition, a radiator 6 is mounted on the vehicle in a space defined by the inside surface of the upper frame member 4 and the inside surfaces of the front end parts 2a, 2a of the two front side frames 2, 2.

According to the present invention, the radiator 6 is provided with a projection 7 extending upwards from the top surface thereof, and the upper frame member 4 is provided with an opening 8 corresponding to the projection 7 so that the projection 7 is resiliently retained therein by a resilient supporting member 9 inserted through the opening 8.

Referring to FIGS. 2-6, the projection 7 comprises a pin projecting from an upper surface of an upper tank 6a of the radiator 6, and a pair of projections 7, 7 are provided on the left and the right sides thereof. The resilient supporting member 9 comprises a tubular bracket 10 having on its upper portion a flange 10a, and a resilient member 11 made of rubber or the like. The resilient member 11 comprises a central tubular part 11a for mounting on the projection 7 and a flange part 11b formed on the periphery of the tubular part 11a. The resilient member 11 is fixed, by heating or the like, to the bracket 10 on the outer peripheral edge 11c of the flange part 11b thereof. The resilient supporting member 9 thus formed is inserted from above, through each of a pair of left and right openings 8, 8 which open upwardly through the upper frame member 4, with the tubular part 11a thereof mounted on the corresponding projection 7 on each side. The bracket 10 is fastened, at the flange 10a, to an upper surface of the frame member 4 with a pair of bolts or screws 12, 12.

Figure 2:
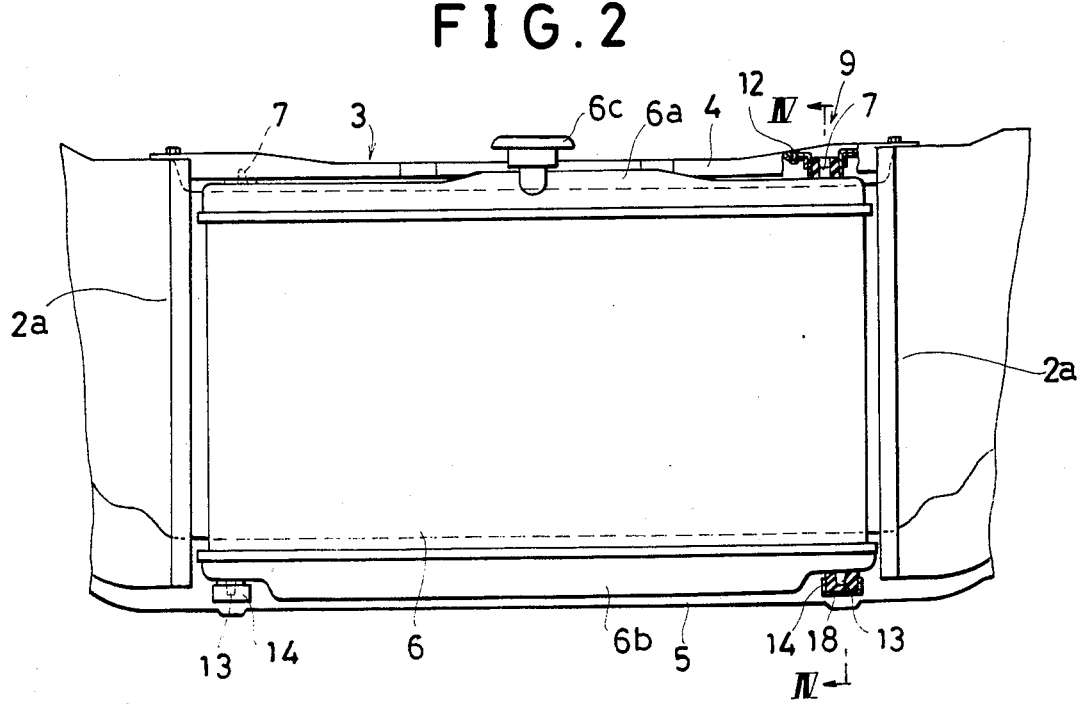
FIG. 2 is a rear side view of a radiator thereof attached to the car body with the apparatus of the present invention.

As shown in FIGS. 2 and 4, the lower portion of the radiator 6 is supported on respective rubber members 18, 18 on a pair of left and right brackets 14, 14 projecting from a rear surface of the lower frame member 5. A pair of left and right pins 13 projecting from a lower surface of the radiator are mounted in the rubber members 18, 18.

The flange part 11b of the resilient member 11 is provided, at its sides, with a pair of left and right slots 11d, 11d so that the elastic coefficient of the resilient member 11 may be lowered in the vertical direction and thus, a dynamic damper effect is obtained with the radiator 6 serving as a damper mass. Lest the radiator 6 should be moved to excess in the front and rear directions during quick braking or quick starting of the vehicle, it is desirable to form the slots 11d only on the sides.

Additionally, in the embodiment shown, the slot 11d on each side is formed into an arcuate opening which is nearly concentric with the tubular section 11a and is nearly 120° in its central angle. Further, the slots 11d are formed with the longitudinal, intermediate region thereof being smaller in width than both end regions thereof such that a projection remainder 11e is formed projecting from the intermediate region of the edge of the arcuate opening. Thus, the projection remainder 11e may serve as a stopper for preventing the radiator 6 from moving excessively in the vehicle width direction, that is, in the lateral direction.

Additionally, in the illustrated embodiment, the outer peripheral edge 11c of the flange part 11b of the resilient member 11 is formed into a tubular shape which encloses the lower end of the tubular bracket 10. A portion of the periphery of the lower end of the tubular bracket 10 is bent outwards, and the resilient member 11 and the tubular bracket 10 are joined together in such a manner that the resultant bent parts 10b, 10b thereof are enclosed within member 11 so that the two bent parts 10b, 10b prevent the tubular bracket 10 from separating from the resilient member 11. In addition, when the upper surface of the radiator 6 strikes against the lower end of the outer peripheral edge part 11c due to excessive upward and downward movement of the radiator 6, the striking force thereof is received by the comparatively wide receiving surface 11f which is below the surface of each bent part 10b, and consequently the resilient member 11 may be improved in its durability.

FIG. 7 shows a modified embodiment thereof. In this embodiment, projection 7 is formed by enlarging an integral portion of the upper surface of the upper tank 6a. The resilient supporting member 9 comprises a tubular bracket 15 having on its upper end a flange 15a and on its lower end a bottom wall 15b, a cup-shaped seat plate 16 for covering the top of the projection 7, and plural resilient pieces 17 of rubber or the like interposed between the bottom wall 15b of the bracket 15 and the seat plate 16. If the resilient supporting member 9 is inserted from above into the opening 8 in the upper frame member 4, and the flange 15a is fastened with bolts or screws to the upper frame member 4 in the same manner as in the previous embodiment with the seat plate 16 thereof in abuttment with the projection 7, the projection 7 is resiliently retained by the resilient supporting member 9 from above and from all sides.

Figure 3:
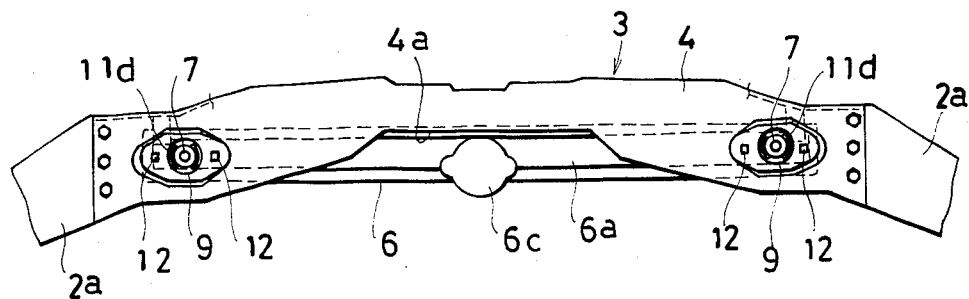
FIG. 3 is a top plan view thereof.
Figure 5:
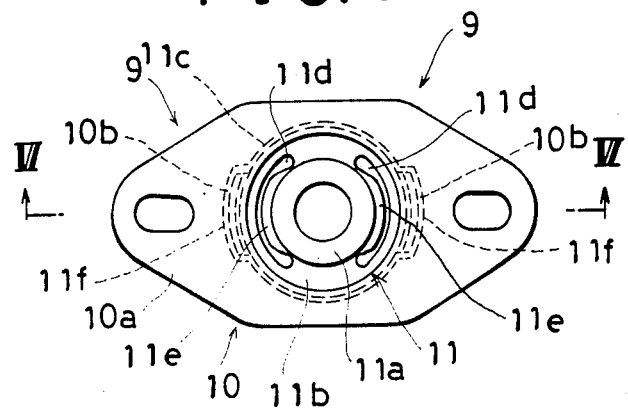
FIG. 5 is a top plan view of a resilient supporting member thereof.
Figure 6:
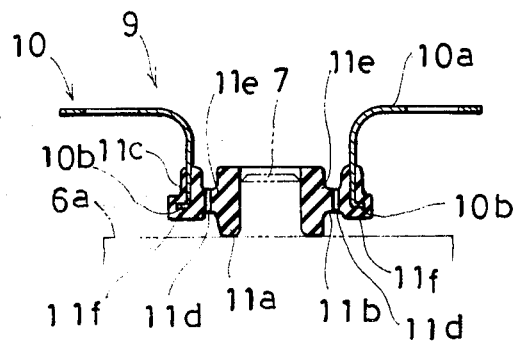
FIG. 6 is a sectional view taken along the line VI—VI in FIG. 5.

Additionally, in the present invention, in order to avoid a water filling opening member 6c connected to the upper tank 6a of the radiator 6 from protruding substantially rearwardly of the tank 6a so that it does not interfere with the upper frame member 4, the upper frame member 4 is designed such that its rear side region located near the water filling opening 6c has recessed part 4a, as shown clearly in FIG. 3.

In mounting a radiator in a vehicle, the resilient supporting member 9 is inserted through the opening 8 through the upper frame member 4 of the bulkhead frame 3 and the projection 7 of the radiator 6 is resiliently retained therein. Thus, it becomes possible to assemble the radiator by bolting or screwing the radiator to the bulkhead frame from above the vehicle body 1.

Additionally, it is not necessary to provide any stay or the like of a cantilever type which protrudes sideways or laterally from each side of the radiator 6. Thus, the size of the radiator 6 can be increased in its lateral width as compared with a conventional radiator, and additionally the increase in the weight of the stay for enhancing the strength thereof can be eliminated.

Thus, according to the present invention, the radiator is provided on its top surface with a projection, and the upper frame member of the bulkhead frame is provided with a corresponding opening therethrough, so that the projection may be resiliently retained by a resilient supporting member inserted in the opening. Thus, conventional stays extending sideways can be eliminated such that the weight of the attaching member can be decreased as compared with conventional attaching members using stays of the cantilever support type. Further, the attachment of the radiator to the bulkhead frame can be carried out from above the vehicle body and also its attachment can be improved. In addition, the radiator can be increased in its lateral width as compared with conventional radiators, resulting in an increase in the cooling capacity.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A radiator attaching apparatus for attaching a radiator to a vehicle having a bulkhead frame with an upper frame member for interconnecting front end parts of a pair of right and left side frames and a radiator located in a space defined by the upper frame member of the bulkhead frame and the front end parts of the two side frames, said apparatus comprising:
   at least one projection extending upwards from the upper surface of the radiator;
   at least one opening in the upper frame member at a position corresponding to the projection; and
   a resilient support means position in the opening wherein the projection is resiliently retained in the opening by the resilient support means, said resilient support means including
   a bracket having an insertion portion and having a flange on an upper portion, and
   a resilient member, said resilient member being mounted on said insertion portion, said resilient member resiliently supporting the projection, said flange being bolted to an upper surface of the upper frame member, said insertion portion being freely insertable from the upper surface of the upper frame member into the opening in the upper frame member.

2. A radiator attaching apparatus as claimed in claim 1, wherein said resilient member has a central tubular part mounted on the projection and a flange part on the periphery of the central tubular part, wherein the resilient member is fixed, at the peripheral edge of the flange part thereof, to the bracket.

3. A radiator attaching apparatus as claimed in claim 2, wherein the flange part of the resilient member includes slots formed in the side regions thereof.

4. A radiator attaching apparatus as claimed in claim 3, wherein the slots on each side comprise an arcuate opening which is concentric with the tubular part and each slot is smaller in width at the intermediate region thereof.

5. A radiator attaching apparatus as claimed in claim 2, wherein the bracket includes an outwardly bent part at the lower peripheral end thereof, the bent part being enclosed from below by the outer peripheral edge of the flange part.

6. A radiator attaching apparatus as claimed in claim 1, wherein the resilient supporting means comprises a bracket with a bottom wall for insertion and attachment to the opening, a cup-shaped seat plate for covering the projections from above, and a plurality of resilient pieces positioned between the bottom wall of the bracket and the seat plate.

7. A radiator attaching apparatus as claimed in claim 1, wherein the radiator includes a water filling opening at the top thereof, and wherein, the upper frame member includes a recessed portion at rear side region thereof, the water filling opening being located in the recessed portion.

* * * * *